United States Patent [19]

Clayburn

[11] Patent Number: 4,890,044
[45] Date of Patent: Dec. 26, 1989

[54] HIGH FREQUENCY SIGNAL SUPPRESSION COMPONENT

[75] Inventor: Randall C. Clayburn, Indianapolis, Ind.

[73] Assignee: RCA Licensing Corporation, Princeton, N.J.

[21] Appl. No.: 175,644

[22] Filed: Mar. 28, 1988

Related U.S. Application Data

[63] Continuation of Ser. No. 880,225, Jun. 30, 1986, abandoned.

[51] Int. Cl.⁴ .................. H01J 29/70; H01P 1/18; H03H 7/00
[52] U.S. Cl. .................................... 315/411; 333/158; 333/181
[58] Field of Search ................. 315/411; 363/56; 333/181–185, 12, 158; 174/111; 336/100, 175

[56] References Cited

U.S. PATENT DOCUMENTS

| 3,375,436 | 3/1968 | Denton | 315/411 |
| 4,347,487 | 8/1982 | Martin | 174/36 |
| 4,656,451 | 4/1987 | Pomponoi | 333/12 |

Primary Examiner—Theodore M. Blum
Assistant Examiner—Gregory C. Issing
Attorney, Agent, or Firm—Eugene M. Whitacre; Joseph J. Laks; Harvey D. Fried

[57] ABSTRACT

A signal suppression component such as a ferrite shield bead includes a cylindrical magnetically permeable element that has a passage formed through it. The passage is filled with an elastic silicone rubber compound. When the component is placed on a conductor or component lead, the elastic material forms a dampening layer between the conductor and the permeable element to prevent audible vibration of the element due to current flow in the conductor.

9 Claims, 2 Drawing Sheets

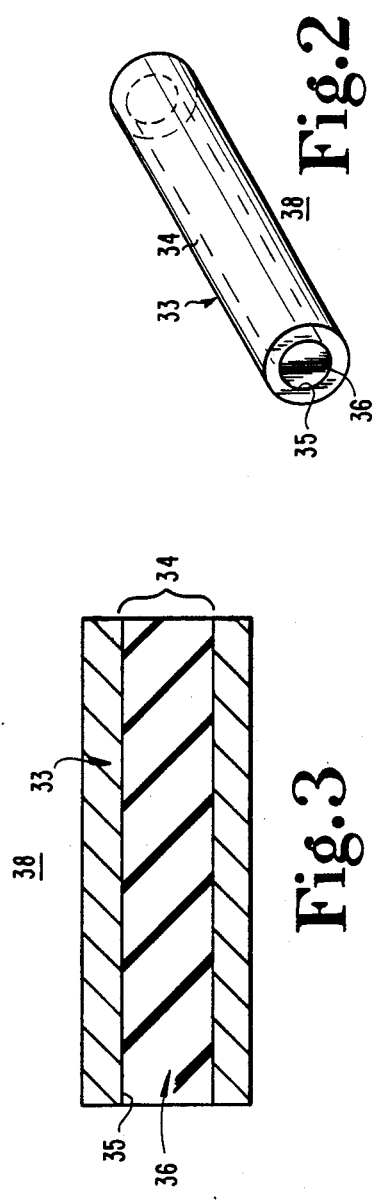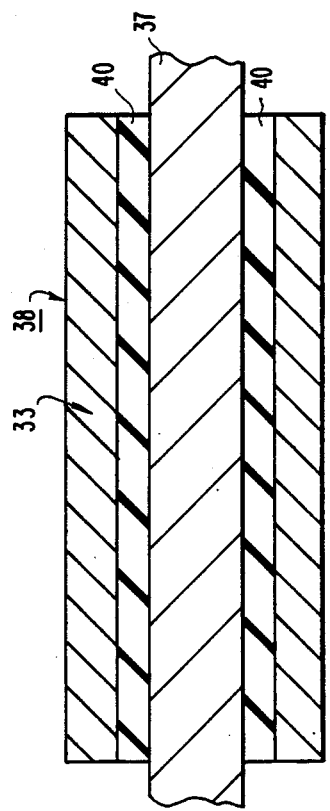

HIGH FREQUENCY SIGNAL SUPPRESSION COMPONENT

This is a continuation of application Ser. No. 880,225, filed 6/30/86, abandoned.

This invention relates to high frequency signal suppression components for use in video display apparatus.

Video display apparatus, such as television receivers or computer monitors, may incorporate circuitry that either generates, or is susceptible to, high frequency interference signals. In order to attenuate the propagation of these high frequency signals, or reduce the amount of high frequency energy that reaches particularly sensitive circuitry, signal suppression components may be placed along the conductor paths or component leads leading to or exiting from the circuits or components that are desired to be isolated. These components, which may be of a tubular form, are manufactured of a material, such as nickel-zinc ferrite, or a similar soft ferrite material, that act as high frequency chokes and attenuate high frequency current flowing in the circuit or component conductors. These shield beads, also referred to as ferrite beads, are placed over appropriate circuit or component leads. The size of the bead and type of material from which the bead is formed are selected based on the signal attenuation characteristics desired. These characteristics are supplied by the manufacturers of the shield or ferrite beads, such as Fair-Rite Products Corp., for example.

The horizontal deflection output circuit and the horizontal deflection flyback pulse-derived power supplies comprise circuits where the previously described ferrite beads may be required. The horizontal output circuit, for example, incorporates fast switching diodes that generate spurious high frequency signals. The horizontal or line rate signal, of the order of 15.75 kHz, for example, associated with these circuits, may cause the ferrite beads to vibrate against the mounting circuit board or against components or conductors, producing audible tones that may be distracting or unpleasant to the video display apparatus user. Gluing each of the ferrite beads in place to prevent vibration is time consuming, and consequently increases the cost of the video display apparatus.

In accordance with an aspect of the present invention, a high frequency signal suppression component comprises a magnetically permeable member having a passage formed through it. An elastic material, located within the passage, permits an electrical conductor to be inserted through the passage and forms an elastic layer between the conductor and the member.

In the accompanying drawing,

FIG. 2 is an isometric view of a high frequency signal suppression component in accordance with an aspect of the present invention;

FIG. 3 is a cross-sectional plan view of the signal suppression component shown in FIG. 2; and FIG. 4 is a cross-sectional plan view of the component shown in FIG. 2, illustrating an aspect of its operation.

Figure 1:
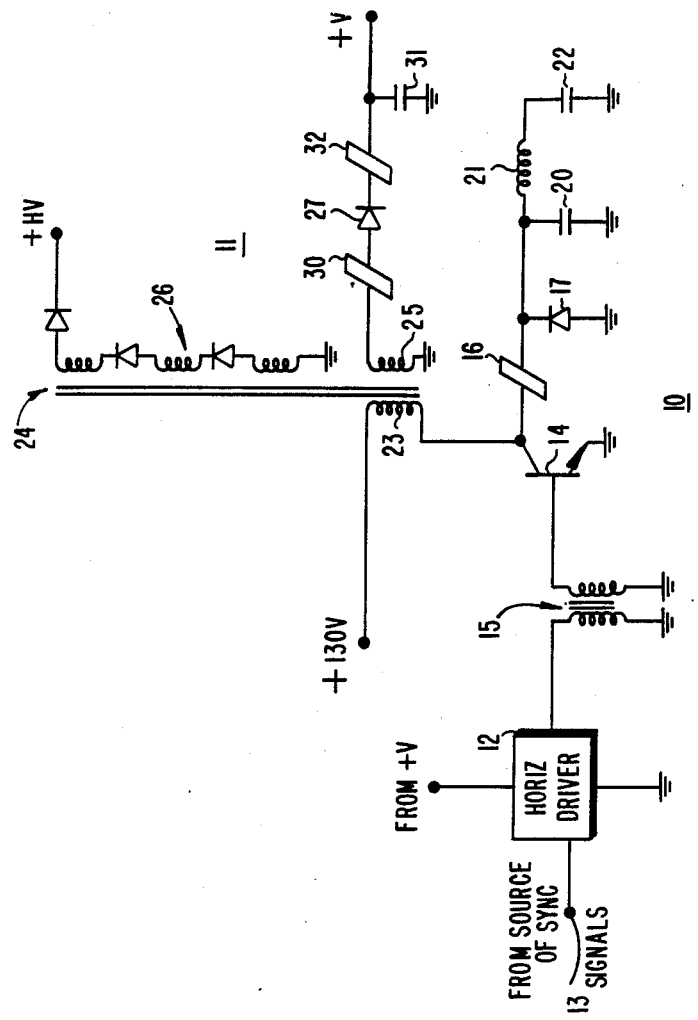
FIG. 1 is a block and schematic diagram of a portion of a video display apparatus, illustrating an aspect of the present invention.

FIG. 1 illustrates a portion of a video display apparatus including a horizontal or line rate deflection circuit 10 and a power supply circuit 11. Horizontal deflection circuit 10, which may be of a conventional resonant retrace-type, includes horizontal driver circuitry 12 that receives horizontal or line rate synchronizing pulses from a source of synchronizing signals (not shown) via a terminal 13. Horizontal driver circuitry 12 generates switching pulses which are applied to the base of a horizontal output transistor 14 via a transformer 15. The collector of output transistor 14 is coupled via a high frequency signal suppression component 16, such as a ferrite shield bead, to the cathode of a damper diode 17, one terminal of a retrace capacitor 20, and one terminal of a deflection winding 21. The other terminal of deflection winding 21 is coupled via an S-shaped capacitor 22 to ground. The emitter of output transistor 14, the anode of diode 17, and the other terminal of capacitor 20 are also coupled to ground potential. Output transistor 14 produces horizontal deflection current in deflection winding 21 that generates an electromagnetic field in order to deflect the electron beams produced by a cathode ray tube (not shown). Signal suppression component 16 is present to attenuate the high frequency spurious signals generated by the switching of damper diode 17.

Power is applied to output transistor 14 from a source of potential of the order of +130 volts via a primary winding 23 of a power supply transformer 24. Flyback or resonant retrace pulses produced by the switching of output transformer 14 appear across primary winding 23. By transformer action, voltages are produced across secondary winding 25 and high voltage winding 26. High voltage winding 26 produces the high voltage or ultor potential for the cathode ray tube (not shown) at a terminal designated +HV. The current produced by the voltage developed across secondary winding 25 is rectified by a diode 27 via a signal suppression component 30, such as a ferrite bead, and charges a capacitor 31 via a similar signal suppression component 32 in order to produce a load circuit supply voltage at a terminal designated +V. In FIG. 1, this voltage is illustratively used to power horizontal driver circuitry 12. Signal suppression components 30 and 32 act to attenuate high frequency spurious signals produced by alternating current flow in diode 27, for example.

In accordance with a novel aspect of the present invention, signal suppression components 16, 30 and 32 are representatively shown as component 38 in FIGS. 2, 3, and 4. Component 38 comprises a magnetically permeable member 33, illustratively shown as having a cylindrical form in FIGS. 2 and 3. Signal suppression components having noncircular cross-sections are of course possible. Member 33 is illustratively manufactured of a soft ferrite material, such as nickel-zinc ferrite, magnesium-zinc ferrite, or manganese-zinc ferrite, for example. Member 33 has a longitudinal passage 34 formed through it that defines an inner wall 35 of member 33. Passage 34 is filled with a plug of an elastic material 36, illustratively comprising a silicone rubber compound manufactured, for example, by Dow Corning Corporation in a variety of formulations under the trade name Sylgard. The desired characteristics of elastic material 36 are such that a conductor or wire 37, shown in FIG. 4, such as the conductor between the collector of output transistor 14 and diode 17, may be inserted through elastic material 36 and consequently through passage 34 without distorting or bending conductor 37. The diameter of passage 34 is chosen such that elastic material 36 forms a resiliant layer or cushion 40 between the inner wall 35 of member 33 and conductor 37. Layer 40 acts as a dampening or attenuating agent to substantially prevent the vibration of component 38 on conductor 37, and therefore substantially eliminates any generation of audible signals when horizontal or line rate current is flowing in conductor 37. Component 38 therefore eliminates the need to glue or otherwise restrain the movement of signal suppression components in order to prevent audible vibration. The viscosity of elastic material 36 may be selected to produce optimum vibration attenuation based on the particular application and location of the signal suppression component 38. For example, the use of the combination Dow Corning Sylgard 527 and Sylgard 567 in various ratios produces a wide range of material viscosities. It is therefore possible to select a particular compound ratio that will result in optimum signal attenuation for a particular application or location of suppression component 38.

In accordance with another novel aspect of the present invention, the adhesion between elastic material 36 and conductor 37 is sufficient to hold component 38 in place on conductor 37 during assembly of the video display apparatus without the need for additional attachment means. This greatly simplifies assembly as it eliminates the need for manually maintaining signal suppression components in place on their respective conductors or electrical component leads, for example, until those conductors or electrical components are inserted into a circuit board.

Component 38 may be formed, for example, by dipping member 33 in a container of the desired elastic material 36, or by placing member 33 in elastic material 36 and then removing the excess elastic material by suction. In either process, a plug of elastic material 36 will remain in passage 34 of member 33.

What is claimed is:

1. In a circuit having a conductor that generates undesired signal energy of a high frequency when current flows therein, a high frequency signal energy absorption arrangement comprising:
   a bead-like member having a longitudinal passage that defines an inner wall and that receives said conductor therethrough, said passage being wide enough to permit movement of said bead-like member on said conductor, said member formed from a material that is magnetically permeable for absorbing enough high frequency signal energy to subject said member to vibrating motion to make said bead-like member susceptible to audible vibration against said conductor; and
   an elastic nonpermeable material not subject to said vibrating motion and capable of damping said vibrating motion, said elastic material being disposed within said passage to form an elastic layer beteen said conductor and said inner wall of said member to permit relative movement between said member and said conductor in a resilient manner that substantially prevents audible vibration of said member against said conductor.

2. The arrangement defined in claim 1, wherein said elastic material adheres to said conductor for maintaining said member in place on said conductor without additional attachment means.

3. The arrangement defined in claim 1, wherein said elastic material comprises a silicone rubber compound.

4. The arrangement defined in claim 1, wherein the viscosity of said elastic material is chosen in accordance with the size of said member.

5. In a circuit having a conductor that generates undesired signal energy of a high frequency when current flows therein, a high frequency signal energy absorption arrangement comprising:
   a bead-like member having a longitudinal passage that defines an inner wall and that receives said conductor therethrough, said passage being wide enough to permit movement of said bead-like member on said conductor, said member formed from a material that is magnetically permeable for absorbing high frequency signal energy; and
   an elastic nonpermeable material disposed within said passage to form an elastic layer between said conductor and said inner wall of said member, said elastic material being a resilient material having a viscosity that permits displacement of said material during insertion of said conductor without significant bending of the conductor, and that permits said member to adhere in place on said conductor.

6. A line rate deflection circuit for a video display apparatus comprising:
   an output circuit incorporating an output device providing a line rate deflection current in a conductor;
   a high frequency signal suppression means located on said conductor comprising:
   a magnetically permeable bead-like member having a passage formed therethrough for receiving said conductor, and being subject to vibrating motion as a consequence of energy absorption of said high frequency signal; and
   an elastic nonpermeable material not subject to said vibrating motion and capable of damping said vibrating motion, said elastic material being disposed within said passage and displacing said conductor for forming an elastic layer between said conductor and said member to permit relative movement between said member and said conductor in a resilient manner that substantially prevents audible vibration of said member against said conductor.

7. The arrangement defined in claim 6, wherein said elastic material substantially prevents audible vibration of said member due to said line rate current flowing in said conductor.

8. The arrangement defined in claim 6, wherein said elastic material adheres to said conductor for maintaining said member in place on said conductor without additional attachment means.

9. A flyback power supply circuit for a video display apparatus comprising:
   a transformer incorporating a winding producing a flyback power supply derived current in a conductor;
   a high frequency signal suppression means located on said conductor comprising: p1 a magnetically permeable bead-like member having a passage formed therethrough for receiving said conductor, and being subject to vibrating motion as a consequence of energy absorption of said high frequency signal; and
   an elastic nonpermeable material not subject to said vibrating motion and capable of damping said vibrating motion, said elastic material being disposed within said passage and displacing said conductor for forming an elastic layer between said conductor and said member to permit relative movement between said member and said conductor in a resilient manner that substantially prevents audible vibration of said member against said conductor.

* * * * *

UNITED STATES PATENT AND TRADEMARK OFFICE
CERTIFICATE OF CORRECTION

PATENT NO.  : 4,890,044
DATED       : December 26, 1989
INVENTOR(S) : Randall C. Clayburn It is certified that error appears in the above-identified patent and that said Letters Patent is hereby corrected as shown below:

Claim 9, third paragraph should be:

--a high frequency signal suppression means located on
   said conductor comprising:
 a magnetically permeable bead-like member having a passage formed
   therethrough for receiving said conductor, and being subject
   to vibrating motion as a consequence of energy absorption
   of said high frequency signal; and--

Signed and Sealed this

Twentieth Day of August, 1991

Attest:

HARRY F. MANBECK, JR.

Attesting Officer

Commissioner of Patents and Trademarks